US009920281B2

(12) United States Patent
Smith et al.

(10) Patent No.: US 9,920,281 B2
(45) **Date of Patent: *Mar. 20, 2018**

(54) SOIL RESISTANT SURFACE TREATMENT

(75) Inventors: Kim R. Smith, Woodbury, MN (US); Erik C. Olson, Savage, MN (US); Keith E. Olson, Apple Valley, MN (US); Steven E. Lentsch, St. Paul, MN (US); Minyu Li, Oakdale, MN (US); Catherine Hanson, Hastings, MN (US); Andrew Wold, St. Louis Park, MN (US)

(73) Assignee: Ecolab USA Inc., Saint Paul, MN (US)

( * ) Notice: Subject to any disclaimer, the term of this patent is extended or adjusted under 35 U.S.C. 154(b) by 465 days.

This patent is subject to a terminal disclaimer.

(21) Appl. No.: 13/304,844

(22) Filed: Nov. 28, 2011

(65) Prior Publication Data

US 2012/0088420 A1 Apr. 12, 2012

Related U.S. Application Data

(63) Continuation-in-part of application No. 12/617,121, filed on Nov. 12, 2009, now Pat. No. 8,222,196.

(Continued)

(51) Int. Cl.

*C11D 3/20* (2006.01)
*C08L 23/02* (2006.01)

(Continued)

(52) U.S. Cl.

CPC .............. *C11D 3/2086* (2013.01); *C11D 3/33* (2013.01); *C11D 3/36* (2013.01); *C11D 3/3707* (2013.01);

(Continued)

(58) Field of Classification Search

USPC .......................................................... 442/93

See application file for complete search history.

(56) References Cited

U.S. PATENT DOCUMENTS

| | | | |
|---|---|---|---|
| 2,674,619 | A | 4/1954 | Lundsted |
| 2,677,700 | A | 5/1954 | Jackson et al. |

(Continued)

FOREIGN PATENT DOCUMENTS

| | | |
|---|---|---|
| EP | 0449509 | 10/1991 |
| EP | 0458591 | 11/1991 |

(Continued)

OTHER PUBLICATIONS

Chen, Wei et al., "Ultrahydrophobic and Ultralyophobic Surfaces: Some Comments and Examples", Langmuir, Apr. 24, 1999, 15 (10), pp. 3395-3399. http://pub.acs.org.proxy.lib.uiowa.edu/doi/full/10.1021/1a990074s, [retrieved on Aug. 24, 2011].

(Continued)

*Primary Examiner* — Bijan Ahvazi
*Assistant Examiner* — Thuy-Ai N Nguyen
(74) *Attorney, Agent, or Firm* — McKee, Voorhees & Sease, PLC

(57) ABSTRACT

A soil resistant laminate composition and a soil resistant treatment use composition are provided. In particular, a laminate composition comprising a multilayer composition of a clean surface and a dried layer of a soil resistant agent are disclosed. Soil resistant agents according to the invention include copolymers of a maleic/olefin, an olefin/acrylate and combinations thereof and are suitable for delivery with a water or other organic solvent carrier. A kit and methods for treating a clean surface using a soil resistant laminate composition and a soil resistant treatment use composition are provided by the present invention.

22 Claims, 7 Drawing Sheets

Related U.S. Application Data

(60) Provisional application No. 61/422,278, filed on Dec. 13, 2010, provisional application No. 61/422,280, filed on Dec. 13, 2010, provisional application No. 61/422,282, filed on Dec. 13, 2010.

(51) Int. Cl.

| | |
|---|---|
| ***C11D 3/33*** | (2006.01) |
| ***C11D 3/36*** | (2006.01) |
| ***C11D 3/37*** | (2006.01) |
| ***C11D 11/00*** | (2006.01) |

(52) U.S. Cl.
CPC ........ *C11D 3/3765* (2013.01); *C11D 11/0041* (2013.01); *Y10T 428/31649* (2015.04); *Y10T 428/31667* (2015.04); *Y10T 428/31699* (2015.04); *Y10T 428/31833* (2015.04); *Y10T 428/31935* (2015.04); *Y10T 442/2279* (2015.04)

(56) References Cited

U.S. PATENT DOCUMENTS

| | | | | |
|---|---|---|---|---|
| 2,903,486 | A | 9/1959 | Brown et al. | |
| 2,972,592 | A | 2/1961 | Brown et al. | |
| 3,048,548 | A | 8/1962 | Martin et al. | |
| 3,308,078 | A | 3/1967 | Rogers et al. | |
| 3,382,178 | A | 5/1968 | Lissant et al. | |
| 3,574,124 | A | 4/1971 | Lyness et al. | |
| 3,664,961 | A | 5/1972 | Norris | |
| 3,785,860 | A | 1/1974 | Zdanowski | |
| 3,793,275 | A | 2/1974 | Corey et al. | |
| 3,917,552 | A | 11/1975 | Bischoff | |
| 3,929,678 | A | 12/1975 | Laughlin et al. | |
| 4,017,662 | A | 4/1977 | Gehman et al. | |
| 4,363,756 | A | 12/1982 | Sepulveda et al. | |
| 4,565,647 | A | 1/1986 | Llenado | |
| 4,613,679 | A | 9/1986 | Mainord | |
| 4,725,319 | A | 2/1988 | Osberghaus | |
| 4,869,934 | A | 9/1989 | Jethwa | |
| 4,877,691 | A | 10/1989 | Cockrell, Jr. | |
| 4,909,962 | A | 3/1990 | Clark | |
| 5,137,793 | A | 8/1992 | Cockrell, Jr. | |
| 5,290,954 | A | 3/1994 | Roberts et al. | |
| 5,407,700 | A | 4/1995 | Man et al. | |
| 5,458,532 | A | 10/1995 | Cannone | |
| 5,460,887 | A | 10/1995 | Pechhold | |
| 5,534,184 | A | 7/1996 | Underwood | |
| 5,605,493 | A | 2/1997 | Donatelli et al. | |
| 5,683,143 | A | 11/1997 | Peterson et al. | |
| 5,707,708 | A | 1/1998 | Pechhold | |
| 5,753,604 | A | 5/1998 | Soldanski et al. | |
| 5,834,088 | A | 11/1998 | Pechhold | |
| 5,945,472 | A | 8/1999 | Duong et al. | |
| 6,074,436 | A * | 6/2000 | Wang et al. | 8/115.62 |
| 6,180,592 | B1 | 1/2001 | Smith et al. | |
| 6,223,383 | B1 | 5/2001 | VanPutten | |
| 6,234,886 | B1 | 5/2001 | Rivard et al. | |
| 6,261,164 | B1 | 7/2001 | Rivard et al. | |
| 6,326,344 | B1 | 12/2001 | Levitt | |
| 6,403,546 | B1 | 6/2002 | Hernandez | |
| 6,701,940 | B2 | 3/2004 | Tsibouklis et al. | |
| 7,033,258 | B2 | 4/2006 | Jordan | |
| 7,132,479 | B2 | 11/2006 | Engelhardt et al. | |
| 7,204,745 | B2 | 4/2007 | Thysell | |
| 7,465,774 | B1 | 12/2008 | Schade et al. | |
| 7,550,199 | B2 | 6/2009 | Hopkins et al. | |
| 7,655,609 | B2 | 2/2010 | Torres et al. | |
| 7,776,108 | B2 | 8/2010 | Shah et al. | |
| 2003/0060395 | A1* | 3/2003 | Chang et al. | 510/460 |
| 2005/0096239 | A1 | 5/2005 | Barnabas et al. | |
| 2005/0172428 | A1 | 8/2005 | Thysell | |
| 2006/0128585 | A1 | 6/2006 | Adair et al. | |
| 2006/0160953 | A1 | 7/2006 | Wautier et al. | |
| 2006/0211340 | A1 | 9/2006 | Thysell | |
| 2007/0099549 | A1 | 5/2007 | Palushaj | |
| 2007/0128989 | A1 | 6/2007 | Jentgens et al. | |
| 2007/0207922 | A1 | 9/2007 | Haindl et al. | |
| 2007/0215184 | A1 | 9/2007 | Jonke et al. | |
| 2007/0226915 | A1* | 10/2007 | Jacobson et al. | 8/115.51 |
| 2007/0253926 | A1* | 11/2007 | Tadrowski et al. | 424/70.13 |
| 2008/0004203 | A1* | 1/2008 | Scheuing et al. | 510/475 |
| 2008/0146734 | A1 | 6/2008 | Youngblood et al. | |
| 2008/0248989 | A1 | 10/2008 | Holderbaum et al. | |
| 2008/0249207 | A1* | 10/2008 | Whiteley et al. | 523/122 |
| 2008/0313819 | A1 | 12/2008 | Penninger et al. | |
| 2009/0170744 | A1 | 7/2009 | Meine et al. | |
| 2009/0311302 | A1 | 12/2009 | Youngblood et al. | |
| 2009/0317621 | A1 | 12/2009 | Youngblood et al. | |
| 2010/0004152 | A1 | 1/2010 | Karagianni et al. | |

FOREIGN PATENT DOCUMENTS

| | | |
|---|---|---|
| EP | 0562730 | 9/1993 |
| EP | 0627281 | 12/1994 |
| EP | 0845326 | 6/1998 |
| EP | 1186379 | 3/2002 |
| EP | 1292428 | 3/2003 |
| EP | 1524077 | 4/2005 |
| EP | 1702714 | 9/2006 |
| GB | 0973294 | 10/1964 |
| GB | 1082153 | 9/1967 |
| GB | 1141943 | 2/1969 |
| GB | 1163852 | 9/1969 |
| GB | 1528592 | 10/1978 |
| JP | 1148416 | 6/1989 |
| JP | 2001192983 | 7/2001 |
| JP | 2005023149 | 1/2005 |
| WO | WO 1994020264 | 9/1994 |
| WO | WO 2001023518 | 4/2001 |
| WO | WO 2005071030 | 8/2005 |
| WO | WO 2006/021529 A1 | 3/2006 |
| WO | WO 2006097141 | 9/2006 |
| WO | WO 2007117952 | 10/2007 |
| WO | WO 2009/074124 A2 | 6/2009 |
| WO | 2009143513 A1 | 11/2009 |
| WO | 2010065481 A1 | 6/2010 |

OTHER PUBLICATIONS

Howarter, John A. et al., "Amphiphile grafted membranes for the separation of oil-in-water dispersions", Journal of Colloid and Interface Science 329 (2009) 127-132 (published online Oct. 1, 2008).

Howarter, John A. et al., "Hydrophilic-oleophobic stimuli-responsive materials and surfaces" Abstract, 1 page, http://docs.lib.purdue.edu/dissertations/AAI3373153/, [retrieved on Aug. 24, 2011].

Howarter, John A. et al., "Oleophobic membranes of enhanced coalescence and separation in oil-in-water systems" POLY 7, Abstract, 1 page, Aug. 16, 2009, http://oasys2.confex.com/acs/238nm/techprogram/P1299044.htm, [retrieved on Aug. 23, 2011].

Howarter, John A. et al., "Self-Cleaning and Anti-Fog Surfaces via Stimuli-Responsive Polymer Brushes★★", Adv. Mater. Oct. 31, 2007, 19, 3838-3843.

Howarter, John A. et al., "Self-Cleaning and Next Generation Anti-Fog Surfaces and Coatings", Macromol. Rapid Commun. 2008, 29, 455-466.

Howarter, John A. et al., "Surface Modification of Polymers with 3-Aminopropyltriethoxysilane as a General Pretreatment for Controlled Wettability", Macromolecules, Jan. 30, 2007, 40, 1128-1132.

Howarter, John A. et al., "Surfactant modified membranes for the separation of oil-in-water emulsions" POLY 705, Abstract, 1 page, Apr. 10, 2008, http://oasys2.confex.com/acs/235nm/techprogram/P1150723.htm, [retrieved on Aug. 24, 2011].

Howarter, John A. et al., "Synthesis and characterization of bulk self-cleaning polymers" POLY 104 Abstract, 1 page, Apr. 6, 2008, http://oasys2.confex.com/acs/235nm/techprogram/P1139556.htm, [retrieved on Aug. 24, 2011].

(56) References Cited

OTHER PUBLICATIONS

Ober, Christopher K. et al., "Block copolymers as surface modifiers: Synthesis, characterization, and relevance to fouling release and biostability" PMSE 353 Abstract, 1 page, Mar. 27, 2003, http://oasys2.confex.com/acs/225nm/techprogram/P609111.htm, [retrieved on Aug. 24, 2011].
Ober, Christopher K. et al., "Surface-Active Materials with Anti-fouling Properties", Proceedings published 2004 by the American Chemical Society, 2 pages.
Stratton, Thomas R. et al., "Activity and biocompatibility of poly-(vinyl pyridine)-based copolymers" PMSE 207 Abstract, Apr. 8, 2008, 1 page, http://oasys2.confex.com/acs/235nm/techprogram/P1158850.htm, [retrieved on Aug. 24, 2011].
Stratton, Thomas R. et al., "Biocompatibility of quaternary poly-(vinyl pyridine)-based bactericidal copolymers as determined by invitro assays of human epithelium" POLY 180 Abstract, 1 page, Aug. 17, 2009, http://oasys2.confex.com/acs/238nm/techprogram/P1297760.htm, [retrieved on Aug. 23, 2011].
Stratton, Thomas R. et al., "In Vitro Biocompatibility Studies of Antibacterial Quaternary Polymers" Biomacromolecules Aug. 27, 2009, 10, 2550-2555.
Youngblood, Jeffrey P. et al., "Bioinspired Materials for Self-Cleaning and Self-Healing" MRS Bulletin, vol. 33, Aug. 2008, www.mrs.org/bulletin, pp. 732-741.
Youngblood, Jeffrey P. et al., "Coatings Based on Side-chain Ether-linked Poly(ethylene glycol) and Fluorocarbon Polymers for the Control of Marine Biofouling", Biofouling, Apr. 19, 2003, vol. 19 (Supplement), pp. 91-98.
Youngblood, Jeffrey P. et al., "Hydrophilic and oleophobic stimuli-responsive surfaces" POLY 76 Abstract, 1 page, Mar. 25, 2007, http://oasys2.confex.com/acs/233nm/techprogram/P1049953.htm, [retrieved on Aug. 24, 2011].
Youngblood, Jeffrey P. et al., "New materials for marine biofouling resistance and release: Semifluorinated and PEGylated block copolymer bilayer coatings" PMSE 351 Abstract, 1 page, Mar. 27, 2003, http://oasys2.confex.com/acs/225nm/techprogram/P595545.htm, [retrieved on Aug. 24, 2011].
Youngblood, Jeffrey P. et al., "Plasma polymerization using solid phase polymer reactants (non-classical sputtering of polymers)", Thin Solid Films, vol. 382, Issues 1-2, Feb. 14, 2001, pp. 95-100.
GreenerDesign Staff, "Purdue Scientists Develop 'Self-Cleaning' Coatings that Repel Oil", GreenerDesign Staff, Created Aug. 18, 2009; http://www.greenbiz.com/print/27077, 2 pages, [retrieved on Aug. 20, 2010].
Clyde Hygiene Company, Norfresh Concentrated Floor Maintainer, printed on Jan. 2, 2008, 2 pages.
Floor Safety Products, Copyright © 2006 Xtreme Traction, 3 pages.
Floortop Floor Cleaner & Maintainer, "Concentrated cleaner for cleaning and maintenance of hard floors", P&G Professional, www.pgprof.com, 1 page.
Friction™ Slip Resistant Cleaner & Polish, Nu-Safe Floor Solutions, Inc., printed Oct. 5, 2004, 1 page.
International Search Report and Written Opinion issued in PCT/IB2010/054508, Ecolab Inc. et al. dated Jul. 27, 2011.
Slip Control, R20 Floor Cleaner-Polisher-Non-Slip, Copyright © 2004 SlipControl.com, last modified Mar. 15, 2006, 4 pages.
Dadepaper, "Stop Slip Floor cleaner and Traction Treament" www.dadepaper.com/productinfo.aspx?guid=2a77581c-5503-4125-b24d-174766ec7b . . . [retrieved on Mar. 1, 2010], 1 page.
International Search Report completed Sep. 26, 2012 and dated Sep. 27, 2012, Applicant: Ecolab USA Inc., Application No. PCT/IB2011/055350 filed Nov. 28, 2011 (12 pages).

* cited by examiner

SOIL RESISTANT SURFACE TREATMENT

CROSS-REFERENCE TO RELATED APPLICATIONS

This application claims priority and is related to U.S. Provisional Application Ser. No. 61/422,282 filed on Dec. 13, 2010 and entitled Soil Resistant Surface Treatment, U.S. Provisional Application Ser. No. 61/422,278 filed on Dec. 13, 2010 and entitled Acrylate-Olefin Copolymers as Soil Resistant Surface Treatment, and U.S. Provisional Application Ser. No. 61/422,280 filed on Dec. 13, 2010 and entitled Acrylates as Soil Resistant Surface Treatment. The entire contents of these patent applications are hereby expressly incorporated herein by reference including, without limitation, the specification, claims, and abstract, as well as any figures, tables, or drawings thereof.

This application is a continuation-in-part application of U.S. application Ser. No. 12/617,121 filed on Nov. 12, 2009, entitled Composition and Method for Removal of Polymerized Non-Trans Fats, now U.S. Pat. No. 8,222,196 issued Jul. 17, 2012. The entire contents of this patent application are hereby expressly incorporated herein by reference including, without limitation, the specification, claims, and abstract, as well as any figures, tables, or drawings thereof.

This application is related to U.S. patent application Publication No. 2012/0148830 published Jun. 14, 2012, entitled Stain Resistant Floor Treatment, and U.S. Pat. No. 8,585,829 issued Nov. 19, 2013, entitled Soil Resistant Floor Treatment, filed simultaneously herewith. The entire contents of these patent applications are hereby expressly incorporated herein by reference including, without limitation, the specification, claims, and abstract, as well as any figures, tables, or drawings thereof.

FIELD OF THE INVENTION

The invention relates to soil resistant surface treatments. In particular, soil resistant laminate compositions are formed using soil resistant treatment compositions according to the invention. The soil resistant treatment compositions comprise polymers and/or copolymers and water or other organic solvent carrier. Kits and methods of cleaning and/or treating surfaces using the soil resistant treatment compositions and laminate compositions are provided for use on a variety of surfaces.

BACKGROUND OF THE INVENTION

Many compositions have been developed for cleaning or coating hard non-porous surfaces. Cleaning compositions often incorporate soil release agents, such as non-surfactant additives applied to a soiled surface as part of a detergent in order to improve soil removal capability of a detergent. Soil release agents are effective by decreasing lubricity of a soiled surface in order to enhance soil removal through mechanical action. Soil release agents are intended for application to soiled surfaces, as application to clean surfaces counterproductively results in attracting soil, causing the surface to become soiled again at a faster rate.

In addition to the difficulty of cleaning hard, non-porous surfaces, once cleaned, it may be difficult to maintain the appearance of the cleaned surface in a satisfactory state. Imparting soil resistance to a clean surface is therefore desirable. Soil resistance is distinct from soil release and acts to minimizes or prevent the adhesion of soil to a treated clean surface.

It is an objective of the claimed invention to develop a soil resistant surface treatment composition for improved soil resistance and cleaning of surfaces, including both porous and/or non-porous surfaces. According to the invention, the soil resistant surface impairs the binding of soil through an intermediary polymer layer which makes it difficult for oily materials to wet the surface and enhances the wetting of water. A further object of the invention is a novel polymeric treatment composition, including soil resistant agents that are polymers and/or copolymers, having a water or organic solvent carrier and methods of using the same to impart soil resistance to a treated surface, such as a clean surface.

A further object of the invention is to provide a method of treating clean surfaces to prevent soils and limit or eliminate adherence to the surfaces.

SUMMARY OF THE INVENTION

In one embodiment of the present invention, a soil resistant laminate composition is provided. The composition includes a multilayer composition of a clean surface and a dried layer, wherein an aqueous solution is applied to a surface to form the dried layer and said aqueous solution is from about 0.005 wt % to about 20 wt % of at least one soil resistant agent having a molecular weight less than about 20,000 g/mol, preferably from about 1,000 to 10,000 g/mol, and more preferably from about 2,000 to 5,000 g/mol, and still more preferably about approximately 3,000 g/mol. The at least one soil resistant agent is selected from copolymers from the group consisting of a maleic/olefin, an olefin/acrylate, and combinations thereof. In an embodiment, the soil resistant agent is substantially free of fluorinated, silicone, alkali soluble resin and/or plasticizer substituents and/or is modified such that no viscosity-building or threshold activity is exhibited. According to an embodiment, the soil resistant laminate composition may be a floor coating that excludes floor finishes.

In a further embodiment the oil/water contact angle ratio of the surface of a laminate formed from the copolymer and a clean substrate is at least 2, at least 4 or at least 6. In another embodiment, a soil resistant laminate composition includes a multilayer composition having an oil/water contact angle ratio of the laminate surface formed from the soil resistant agent and clean substrate of at least 2. The composition includes a clean surface as a bottom layer and a dried layer of at least one soil resistant agent as a top layer, wherein said dried layer is formed from an aqueous solution of from about 0.1% to 5% soil resistant agent, and wherein said soil resistant agent has a molecular weight from about 1,000 to 20,000 g/mol.

In a further embodiment of the invention, a soil resistant laminate composition includes a soil release agent. The soil release agent is from between about 0.1% and about 20% by weight and comprises an olefin/acrylate copolymer.

In a further embodiment of the present invention, a soil resistant use (i.e. treatment) composition is provided. The composition includes a soil resistant agent selected from copolymers from the group consisting of a maleic/olefin, an olefin/acrylate- and combinations thereof having a molecular weight from about 1,000 to 20,000 g/mol; at least one amphoteric acrylic copolymer, such as an olefin/acrylate; and a water or organic solvent carrier. According to an embodiment, the soil resistant agent is a copolymer of maleic/olefin having a ratio of maleic to olefin moieties from about 0.02:1 to 5:1. According to a further embodiment, the ratio of the acrylic to the maleic moieties is from about 0.05:1 to 1:1. Preferably, the composition is substantially free of fluorinated or silicone substituents and said soil release agent is modified such that no viscosity-building or threshold activity is exhibited.

In a further embodiment of the present invention a kit is provided. The kit includes a soil resistant treatment use composition, an applicator, a removal agent for removing a plurality of soils from a treated surface, and instructions for use.

A method for treating a clean surface is further provided by the present invention. The method includes applying to a clean surface an aqueous solution of about 0.005% to 5% of a soil resistant agent selected from polymers and copolymers from the group consisting of a maleic/olefin, an olefin/acrylate and combinations thereof, wherein said soil resistant agent has a molecular weight from about 1,000 to 20,000 g/mol, forming a laminate film of the copolymer soil resistant composition over the clean surface, wherein the laminate film or layer of said soil resistant composition on the clean surface has an oil/water contact angle ratio of at least 2, and removing soils from the laminate film. The method for treating a clean surface may further include diluting the soil resistant agent or composition before application to the clean surface, allowing the laminate film layer to dry and form an invisible film and/or applying a water source and/or mechanical force to remove soils.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

Figure 1A:
FIG. 1 shows soil resistance efficiency of an exterior window after six months of treatment with a maleic/hydrophobicly modified olefin copolymer soil resistant composition (ES8804) compared to an untreated window.

The embodiments of this invention include soil resistant laminate compositions, kits and methods of use of the same, which can vary as understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

As used herein, the term "hard surface" includes, but is not limited to showers, sinks, toilets, bathtubs, countertops, windows, mirrors, transportation vehicles, floors, and the like.

The term "laminate," as used herein, refers to a substrate and at least one continuous or non-continuous coating or layer adhered to a substrate surface by a physical or chemical bond including, for example, by ionic or covalent bonding.

The term "molecular weight," as used herein with reference to the molecular weight of polymers and copolymers, refers to the calculated average molecular weight value of the polymer or copolymer, which one skilled in the art will appreciate to encompass a reasonable percent error as a result of the statistical method applied for such calculation and the variations in the polymer molecules.

The term "soil resistant agent," as used herein, refers to a chemical agent that reduces the severity of a stain (e.g., repels staining) on a substrate surface caused by soil contact, and/or promotes easier stain removal (e.g., releases stains) from a substrate surface by decreasing the adhesion of soil on the surface through substrate surface modification or other physical or chemical mechanisms. As one skilled in the art will ascertain based upon the present disclosure of the invention, a soil resistant agent changes the soil adherence and/or release properties of a treated surface while a soil release agent changes the properties of the soil itself. The properties of soil resistant agents according to the invention are distinct from soil release agents that act on a soil rather than on the surface. This difference is most clearly illustrated by the need to apply a soil release agent with each and every cleaning of the surface, as opposed to the less frequent application of the soil resistant agents according to the invention forming a laminate surface which imparts soil resistance (i.e. repels staining).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

According to an embodiment of the invention a novel polymeric treatment laminate composition, soil resistant treatment use composition and methods of use of the same are provided. The soil resistant laminate composition provides the unexpected advantage of providing sufficient soil resistant activity that facilitates the removal of soil by simple mechanical means, such as a water spray or air flow (e.g. compressed air) alone. Treatment of a clean surface with the polymeric soil resistant treatment composition requires only the mechanical force of air or water flow for soil removal for a period of time. According to a preferred embodiment the removal of soil does not require any water source and is particularly suitable for use in climates having low water availability.

It is a further advantage of the present invention that no detergent is required to clean the laminate composition according to the invention. According to embodiments of the invention water or other organic solvents may be employed as a carrier in place of a detergent composition carrier. Even without the use of a detergent carrier, the compositions and methods of the of the invention allow the easy removal of soils that come into contact with the treated surface through the use of minimal mechanical force, such as air or water flow, providing complete soil removal for an extended period of time. In addition, following such treatment with soil resistant agent according to the invention, soil does not adhere to the laminate, enabling detergent-free subsequent cleaning of the treated surface through the use of minimal mechanical force, such as air or water flow, providing complete soil removal for an extended period of time.

The soil resistant polymeric compositions (including both the soil resistant laminate compositions and soil resistant treatment compositions) of the invention have a wide variety of uses. They can be applied to a wide variety of hard surfaces. According to the invention, the soil resistant agents (which are referred to herein synonymously as the polymers and/or copolymers of the invention) can be applied to a wide variety of hard, non-porous and/or porous surfaces, including for example: architectural surfaces, such as showers, walls, windows, countertops, appliances, tabletops, etc.; vehicle surfaces, such as cars, trucks, boats, railroad cars and planes, especially for problem areas such as windshields, rubberized trim, hulls, aluminum rails, wheels, etc.; commercial or industrial process equipment, such as "clean in place" treatments for food, beverage and other process equipment; grill cleaners, protective treatments for water handling (e.g., process water) systems; grill surfaces and the like. In some embodiments of the invention, hard surfaces may include certain porous surfaces, including for example: textiles or fabrics, floors and the like. Exemplary surfaces intended for use according to the invention include, for example, glass, concrete, porcelain, ceramic, fiberglass, plastic, rubber, metals, hard flooring surfaces, including ceramic tile, concrete and/or stone, paint, a cured polymeric coating, and/or combinations thereof.

Accordingly, the soil resistant laminate compositions and soil resistant treatment compositions of the invention provides suitable compositions and methods for uses including, without limitation, glass cleaner, shower cleaner, hard surface treatment, glass treatment, transport vehicle tire and rim treatment, ware treatment and food processing area treatment. The laminate compositions of the present invention can replace the need for use of detergents and other cleaning agents to remove soils from treated surfaces. According to certain embodiments, the soil resistant laminate compositions and soil resistant treatment compositions, along with the methods of use exclude the use of any detergent composition. In addition, creation of laminate soil resistant surfaces reduces the intensity and frequency of required cleaning activities making the treated surface easier to clean. In certain embodiments of the invention the present invention allows for water-free cleaning and/or low or reduced labor required for cleaning treated surfaces.

Soil Resistant Treatment Compositions

In one embodiment, the soil resistant treatment composition comprises, consists essentially of or consists of at least one soil resistant agent. According to an embodiment of the invention, the soil resistant treatment compositions change the soil repellency properties of treated surfaces to which they are applied. As used herein, a soil resistant agent refers to a chemical agent that reduces the severity of a stain (e.g., repels staining) on a substrate surface caused by soil contact, and/or promotes easier stain removal (e.g., releases stains) from a substrate surface by decreasing the adhesion of soil on the surface through substrate surface modification or other physical or chemical mechanisms.

An embodiment of the invention includes a soil resistant agent that may be a single component or a multi-component system. The compositions include at least one soil resistant agent, which are understood to refer to any combination of the various soil resistant agents disclosed herein according to the invention.

In one embodiment, the soil resistant agent is a maleic/olefin copolymer. In a further embodiment, the soil resistant agent is an olefin copolymer. In a further embodiment, the olefin is hydrophobically modified and as a result the copolymer is oleophobic to lack affinity for oils and is hydrophilic to attract water. In other embodiments, the olefin is not hydrophobically modified. In a still further embodiment, the soil resistant agent is an olefin/acrylate copolymer and/or maleic/olefin copolymer. In some embodiments, the acrylate is selected from at least one of an acrylate and/or methacrylate polymer, and/or a copolymer of acrylic acid and/or methacrylic acid. It is understood that the polymers and copolymers according to the invention may be modified by the addition of substituents without departing from the intent and scope of the invention. For example, in some embodiments, the polymers or copolymer do not exhibit viscosity-building or any threshold activity.

Maleic/Olefin Copolymers

Copolymers of maleic and olefin moieties may be employed as a soil resistant agent according to the invention. Particularly suitable maleic/olefin copolymers include those having a maleic/hydrophobicly-modified olefin moieties. The olefin segment may include a variety of linear, branched and cyclic alkenes. Suitable alkenes may include or be derived from propylene, ethylene, isobutylene or butylene. Particularly suitable alkenes may include or be derived from butylene, for example, isobutylene and diisobutylene. Exemplary maleic/olefin copolymers are commercially available from BASF and include ES8804 and Sokalan CP9.

According to an embodiment of the invention, the polycarboxylate copolymer soil resistant agent comprises, consists essentially of or consists of a maleic/hydrophobicly-modified olefin copolymer. In some embodiments, the olefin is selected from at least one of an acrylate or a methacrylate. According to the invention, the copolymer is oleophobic to lack affinity for oils and hydrophilic to attract water. According to a further embodiment the maleic/hydrophobicly-modified olefin copolymer does not exhibit viscosity-building or any threshold activity. According to a preferred embodiment, the copolymer is substantially free of fluorinated or silicone substituents. According to a still further preferred embodiment the copolymer and the compositions according to the invention exclude alkali soluble resins and/or plasticizers, providing suitable compositions for floor and other surfaces coatings that exclude floor finishes. According to a further preferred embodiment the copolymer is substantially free or free of volatile organic compounds and therefore does not contribute to air pollution.

In some embodiments, the maleic/olefin copolymer of the soil resistant laminate composition has a low molecular weight, preferably less than about 20,000 g/mol, preferably less than 10,000 g/mol, more preferably less than about 7,000 and still more preferably less than about 3,000. According to another embodiment of the invention, the copolymer has a molecular weight from about 2,000 to 10,000 g/mol or from about 2,000 to 5,000 g/mol.

Exemplary maleic/olefin copolymers include Sokalan CP9 and ES8804. According to the invention, the maleic/olefin copolymer has a maleic/olefin molar ratio from about 1:4 to 4:1, preferably from about 1:2 to 2:1, more preferably about 1:1. According to a further preferred embodiment, the olefin contains an alkyl group having more than 3 carbons, preferably more than 4 carbons. The glass transition temperature of the maleic/olefin copolymer is above the use temperature of the copolymer, preferably above 10° C.

The maleic/olefin copolymer of the soil resistant laminate composition, according to this embodiment of the invention, has a molecular weight from about 2,000 to 10,000 g/mol and a maleic/olefin ratio from about 1:4 to 4:1. More preferably, the copolymer molecular weight is from about 2,000 to 5,000 g/mol and the maleic/olefin ratio is from about 1:2 to 2:1.

According to the invention, the soil release treatment composition may preferably comprise an aqueous solution of from about 0.1% to 5% maleic/olefin copolymer, and wherein said polymer or copolymer has a molecular weight from about 1,000 to 20,000 g/mol. According to a preferred embodiment, the copolymer is substantially free of fluorinated or silicone substituents. According to a still further preferred embodiment the copolymer and the compositions according to the invention exclude alkali soluble resins and/or plasticizers, providing suitable compositions for floor and other surfaces coatings that exclude floor finishes. According to a further embodiment the maleic/olefin copolymer is modified such that no viscosity-building or threshold activity is exhibited. According to a further preferred embodiment the copolymer is substantially free or free of volatile organic compounds. In a preferred embodiment, the olefin is hydrophobically modified. However, in alternative embodiments, the olefin is not hydrophobically modified.

Acrylate/Olefin Copolymer

Acrylate copolymers may further be employed as a soil resistant agent according to the invention. In one embodiment, the acrylate copolymer is an acrylate/olefin copolymer. In some embodiments, the acrylate is selected from at least one of a polymer or copolymer of acrylic acid or methacrylic acid. The acrylate may further be a methacrylate. In preferred embodiments, the copolymer does not exhibit viscosity-building or any threshold activity.

The acrylate/olefin copolymer of the soil resistant treatment compositions may comprise, consist essentially of or consist of an acrylate selected from at least one of acrylate or methacrylate. According to the invention, the acrylate/olefin copolymer is oleophobic to lack affinity for oils and hydrophilic to attract water. According to a further embodiment of the invention, the acrylate/olefin copolymer does not exhibit viscosity-building or any threshold activity. According to a preferred embodiment, the acrylate/olefin copolymer is substantially free of fluorinated or silicone substituents. According to a further preferred embodiment the copolymer is substantially free or free of volatile organic compounds and therefore does not contribute to air pollution.

The acrylate/olefin copolymer of the soil resistant treatment composition, according to this embodiment of the invention, has a low molecular weight, preferably less than approximately 20,000 g/mol, preferably less than 10,000 g/mol, more preferably less than about 7,000 and still more preferably less than about 3,000. According to another embodiment of the invention, the copolymer has a molecular weight from approximately 2,000 to 10,000 g/mol or from approximately 2,000 to 5,000 g/mol, and more preferably about approximately 3,000 g/mol. The glass transition temperature of the copolymer is above the use temperature of the copolymer, preferably above 10° C.

According to the invention, the soil release treatment composition may preferably comprise an aqueous solution of from about 0.1% to 5% acrylate/olefin copolymer, and wherein said polymer or copolymer has a molecular weight from about 1,000 to 20,000 g/mol.

Additional Soil Resistant Agents and Soil Release Agents

Soil resistant agents according to the invention may be further combined and used with either additional soil resistant agents and/or in combination with soil release agents to provide improved and/or synergistic soil resistance. For example, other suitable soil resistant agents are described further in Example 9. These may also include soil resistant agents, including fluorochemical materials (e.g., Capstone ST100 and ST300 from Dupont), and polycarboxylate copolymers (e.g., Acusol 460 from Dow). However, according to certain embodiments of the invention, Acusol 460 is not desirable for use in a cured film on a solid substrate as it is a threshold agent.

Suitable soil release agents according to the invention include silicone materials such as polydimethysiloxane materials (e.g., Wacker HC303 from Wacker Silicones), and acrylic polymers (Rhoplex EZ Clean 200 from Dow, Polyquart® Pro and Polyquart® Ampho 149 from Cognis Corporation).

Any combination of the foregoing agents may also be used to provide enhanced stain resistance. According to one embodiment, both the soil resistant agent and soil release agents, are substantially free of fluorinated or silicone substituents. According to a further embodiment the compositions, including both the soil resistant agent and soil release agents, are substantially free or free of volatile organic compounds. According to a still further preferred embodiment the soil resistant agents and soil release agents are not combined with nor do they contain any alkali soluble resins and/or plasticizers, providing suitable compositions for floor and other surfaces coatings that exclude floor finishes.

It has further been determined that the soil release agents Polyquart® Pro, Polyquart Ecoclean and/or Polyquart® Ampho 149, which are available from Cognis Corporation, are particularly suitable for use in combination with the soil resistant agents disclosed herein and provide soil resistant capability that is better than the stain resistance achieved when either agent is used alone. Although not intending to be limited according to a particular theory of the invention, the use of a soil release agent imparts a sticky surface for easily wiping/removing soils attracted to the surface. Despite the soil attractant effect of the soil release agents by creating a sticky surface (which when used along would require mechanical force to remove soils, use of compressed air or a water rinse is insufficient for removing soils from a surface treated with a soil release agent), the combined use with the soil resistant agents of the present invention impart a synergistic effect of soil resistance of the treated surface for an extended period of time. As a result, there is an unexpected and synergistic effect on the soil resistance and/or repellency of the treated surface. These components may have a beneficial impact on gloss as well.

Polyquart® Pro, Polyquart Ecoclean and Polyquart® Ampho 149 are amphoteric acrylic copolymers having molecular weights of at least 5,000 g/mol, more particularly, at least 10,000 g/mol. The weight ratio of a Polyquart® composition to a maleic/olefin copolymer may be, for example, from 0.02:1 to 5:1 (where all the materials are 100% active), particularly, from about 0.05:1 to 3:1, more particularly, from about 0.05:1 to 2:1.

Carriers

In some embodiments, the compositions of the present invention are formulated as aqueous use solutions. Carriers can be included in such liquid formulations. Any carrier suitable for use in the soil resistant treatment compositions can be used in the present invention. For example, in some embodiments the compositions include water as a carrier. In further embodiments, the compositions include water or other organic solvents as a carrier. The resulting composition can be homogeneous or non-homogeneous.

According to a preferred embodiment of the invention, the carrier for the soil resistant treatment composition is not a detergent. According to certain embodiments of the invention, the soil resistant treatment composition excludes the use of any additional cleaning agent for use as a detergent.

According to the invention, the carrier may be an organic solvent such as an alcohol or polyol. Low molecular weight primary or secondary alcohols exemplified by methanol, ethanol, propanol, and isopropanol are suitable. In addition, esters, glycol ethers and other solvents disclosed herein the application. Suitable glycol ethers that be used include monopropyleneglycolmonopropyl ether, dipropyleneglycolmonobutyl ether, monopropyleneglycolmonobutyl ether, ethyleneglycolmonohexyl ether, ethyleneglycolmonobutyl ether, diethyleneglycolmonohexyl ether, monoethyleneglycolmonopropyl ether-, diethyleneglycolmonobutyl ether, and mixtures thereof.

In some embodiments, the soil resistant treatment compositions may be formulated as a concentrate and will contain no more than about 99 wt % water or organic solvent and typically no more than about 90 wt % water or organic solvent. In other embodiments, soil resistant treatment compositions will contain at least 50 wt % water or organic solvent, at least 60 wt % water or organic solvent, at least 70 wt % water or organic solvent, or at least 80 wt % water or organic solvent as a carrier. These amounts include all amounts of water or organic solvent in between the ranges as one of skill in the art shall ascertain.

In some embodiments, the soil resistant treatment compositions are used as a use solution and will contain from about 0.01-10 wt % water or organic solvent carrier and typically no more than about 5 wt % water or organic solvent carrier. In other embodiments, soil resistant treatment use solutions compositions will contain at least 0.1-2 wt % water or organic solvent carrier. A use solution according to the invention will contain from about 0.01-20 wt % soil resistant polymer or at a level equal to or greater than the water or organic solvent carrier concentration. These amounts include all amounts of detergent carrier in between the ranges as one of skill in the art shall ascertain.

According to an alternative embodiment of the invention, one of skill in the art can obtain other, non-aqueous forms of the compositions of the invention. These can include for example, solids, liquids including emulsions or dispersions, gels, and pastes. Such embodiments can be a single part or multi part package.

Additional Functional Agents

The compositions may also include additional functional materials. According to certain embodiments of the invention, the soil resistant treatment composition and methods of use exclude the use of any additional cleaning agent and/or surfactant for use as a detergent. As one skilled in the art will ascertain from the present disclosure, additional functional ingredients may be incorporated dependent upon the particular surface in need of treatment. For example, additional functional ingredients, and suitable amounts and formulations thereof, for use on porous and non-porous floor surfaces are disclosed in U.S. Patent Application Publication No. 2012/0148830 published Jun. 14, 2012 and U.S. Pat. No. 8,585,829 issued Nov. 19, 2013, herein incorporated by reference in its entirety. Exemplary suitable functional agents may include, for example, solvents, fragrances, anti-slip agents, gloss agents, including gloss enhancing additives, etc.

For example, according to an embodiment of the invention, a gloss agent, such as a gloss enhancing additive is included in the composition formulations of the invention. According to an additional embodiment of the invention, one or more additives suitable for use in a floor finish application are excluded. According to an exemplary embodiment, an alkali soluble resin, polyethylene, polypropylene and/or surfactant additive are excluded. According to a still further embodiment, the compositions according to the invention remain clear at all times (as opposed to floor finishes which are opaque milky emulsions).

For the purpose of this application, the terms "functional materials" and "functional agents" include materials that when dispersed or dissolved in a use and/or concentrate solution, such as an aqueous solution, provides a beneficial property in a particular use. Some particular examples of functional materials are discussed in more detail below, although the particular materials discussed are given by way of example only, and a broad variety of other functional materials may be used. For example, many of the functional materials discussed below relate to materials used in cleaning applications. However, other embodiments may include functional materials for use in other applications.

Solvents

Certain solvents are suitable for use according to the invention. Solvents may be included as a carrier and/or for even spreading of the compositions across a surface. Exemplary organic solvents that can be used include hydrocarbon or halogenated hydrocarbon moieties of the alkyl or cycloalkyl type, and have a boiling point well above room temperature, i.e., above about 30° C.

Considerations for selecting organic solvents include beneficial properties and aesthetic considerations. For example, in some applications where malodors would not be tolerated, the formulator would be more likely to select solvents which have a relatively pleasant odor, or odors which can be reasonably modified by perfuming.

The C6-C9 alkyl aromatic solvents, especially the C6-C9 alkyl benzenes, preferably octyl benzene, exhibit excellent grease removal properties and have a low, pleasant odor. Likewise the olefin solvents having a boiling point of at least about 100° C., especially alpha-olefins, preferably 1-decene or 1-dodecene, are excellent grease removal solvents.

Generically, the glycol ethers can be used. Exemplary glycol ethers include monopropyleneglycolmonopropyl ether, dipropyleneglycolmonobutyl ether, monopropyleneglycolmonobutyl ether, ethyleneglycolmonohexyl ether, ethyleneglycolmonobutyl ether, diethyleneglycolmonohexyl ether, monoethyleneglycolmonopropyl ether-, diethyleneglycolmonobutyl ether, and mixtures thereof.

Solvents such as pine oil, orange terpene, benzyl alcohol, n-hexanol, phthalic acid esters of C1-4 alcohols, butoxy propanol, Butyl Carbitol® and 1(2-n-butoxy-1-methylethoxy)propane-2-ol (also called butoxy propoxy propanol or dipropylene glycol monobutyl ether), hexyl diglycol (Hexyl Carbitol®), butyl triglycol, isopropyl alcohol, diols such as 2,2,4-trimethyl-1,3-pentanediol, and mixtures thereof, can also be used.

The concentrate can include the organic solvent component in an amount to provide the desired cleaning, product stability and/or evaporative properties. In general, the amount of solvent should be limited so that the use solution is in compliance with volatile organic compound (VOC) regulations for a particular class of cleaner. In addition, it should be understood that the organic solvent is an optional component and need not be incorporated into the concentrate or the use solution according to the invention. According to preferred embodiments the solvent does not afford cleaning properties. When the organic solvent is included in the concentrate, it can be provided in an amount of between about 0.1 wt % and about 75 wt %, between about 1 wt % and about 50 wt %, and between about 3 wt % and about 30 wt %.

Fragrances

Various odorants including perfumes and other aesthetic enhancing agents can also be included in the composition. Fragrances or perfumes that may be included in the compositions include, but are not limited to: terpenoids such as citronellol, aldehydes such as amyl cinnamaldehyde, a jasmine such as C1S-jasmine or jasmal, and vanillin.

Other Functional Materials

In addition to the functional materials mentioned above, other optional additional functional materials that can be included in the soil resistant treatment compositions of the present invention include chelating agents such as ethylene diamine tetraacetic acid (EDTA) and its sodium salts; pH adjusters such as amines, acids and pH buffers; foam modifiers such as defoamers.

The soil resistant treatment compositions, along with its formulation to include a variety of other functional materials, according to the invention and the laminate formed by application of the soil resistant treatment compositions are stable over a relatively wide range of pH values, e.g., between about 3 and about 14.

Soil Resistant Laminate Compositions

A further embodiment of the invention includes a soil resistant laminate composition. The composition comprises, consists essentially of or consists of a multilayer composition comprising a clean surface as a bottom layer and a dried layer of the soil resistant treatment composition.

According to a first embodiment of the invention, the soil resistant laminate composition includes a clean surface as a bottom layer and a dried layer of a polycarboxylate copolymer of maleic/olefin soil resistant agent provided in water or other organic solvent carrier. According to a further embodiment of the invention, the polycarboxylate copolymer of the soil resistant laminate composition comprises, consists essentially of or consists of a maleic/olefin copolymer, which may further be a maleic/hydrophobicly-modified olefin copolymer. According to the invention, the copolymer is oleophobic to lack affinity for oils and hydrophilic to attract water, does not exhibit viscosity-building or any threshold activity, is substantially free of fluorinated or silicone substituents, and/or is substantially free or free of volatile organic compounds.

In some embodiments, a soil resistant laminate composition having a maleic/olefin copolymer as the soil resistant agent has a low molecular weight, preferably less than about 20,000 g/mol, preferably less than 10,000 g/mol, more preferably less than about 7,000 and still more preferably less than about 3,000. According to another embodiment of the invention, the copolymer has a molecular weight from about 2,000 to 10,000 g/mol or from about 2,000 to 5,000 g/mol. According to another embodiment, the maleic/olefin copolymer has a maleic/olefin molar ratio from about 1:4 to 4:1, preferably from about 1:2 to 2:1, more preferably about 1:1. Exemplary maleic/olefin copolymers such as Sokalan CP9 and ES8804 are produced by BASF.

According to a second embodiment of the invention, the soil resistant laminate composition includes a clean surface as a bottom layer and a dried layer of an olefin/acrylate copolymer soil resistant agent provided in a water or other organic solvent carrier. According to a further embodiment of the invention, the olefin/acrylate copolymer of the soil resistant laminate composition according to the invention comprises, consists essentially of or consists of an acrylate-type moiety selected from at least one of an acrylate or a methacrylate. According to the invention, the acrylate/olefin copolymer is oleophobic to lack affinity for oils and hydrophilic to attract water. According to a further embodiment of the invention, the copolymer does not exhibit viscosity-building or any threshold activity. According to a preferred embodiment, the copolymer is substantially free of fluorinated or silicone substituents. According to a further preferred embodiment the copolymer is substantially free or free of volatile organic compounds and therefore does not contribute to air pollution.

In some aspects of the invention, a soil resistant laminate composition having a olefin/acrylate copolymer as the soil resistant agent has a low molecular weight, preferably less than about 20,000 g/mol, preferably less than 10,000 g/mol, more preferably less than about 7,000 and still more preferably less than about 3,000. According to another embodiment of the invention, the acrylate/olefin copolymer has a molecular weight from about 2,000 to 10,000 g/mol or from about 2,000 to 5,000 g/mol. According to a further embodiment, the olefin contains an alkyl group having more than 3 carbons, preferably more than 4 carbons. The glass transition temperature of the acrylate/olefin copolymer is above the use temperature of the copolymer, preferably above 10° C. Exemplary olefin polymers include ES8804 and are produced by BASF Corporation.

According to a third embodiment of the invention, the soil resistant laminate composition includes a clean surface as a bottom layer and a dried layer of an acrylate polymer or copolymer soil resistant agent provided in a water or other organic solvent carrier. The acrylate polymer or copolymer of the soil resistant laminate composition according to the invention comprises, consists essentially of or consists of an acrylate selected from at least one of an acrylic acid or a methacrylic acid polymer or copolymer. According to the invention, the acrylate is oleophobic to lack affinity for oils and hydrophilic to attract water. According to a further embodiment of the invention, the acrylate does not exhibit viscosity-building or any threshold activity. According to a preferred embodiment, the acrylate polymer or copolymer is substantially free of fluorinated or silicone substituents. According to a further preferred embodiment the copolymer is substantially free or free of volatile organic compounds and therefore does not contribute to air pollution.

In some embodiments, a soil resistant laminate composition having an acrylate polymer or copolymer as the soil resistant agent has a low molecular weight, preferably less than approximately 20,000 g/mol, preferably less than 10,000 g/mol, more preferably less than about 7,000 and still more preferably less than about 3,000. According to another embodiment of the invention, the polymer or copolymer has a molecular weight from approximately 2,000 to 10,000 g/mol or from approximately 2,000 to 5,000 g/mol and is selected from the group consisting of acrylic acid, methacrylic acid polymers and copolymers and combinations thereof. Exemplary acrylate polymers include Acusol 460 and are produced by Acusol 929.

According to a still further embodiment of the invention, the soil resistant laminate composition includes a clean surface as a bottom layer and a dried layer of more than one soil resistant agents selected from the group consisting of a polycarboxylate copolymer of maleic/olefin soil resistant agent, an olefin polymer or copolymer soil resistant agent, an acrylate polymer or copolymer soil resistant agent, and combinations thereof, which are provided in a water or other organic solvent carrier. Any combinations of the soil resistant agents disclosed herein may be used for the formulations of any soil resistant treatment composition and/or soil resistant laminate composition according to the invention.

According to the various embodiments of the invention, the suitable copolymers and the compositions according to the invention may exclude alkali soluble resins and/or plasticizers, providing suitable compositions for floor and other surfaces coatings that exclude floor finishes.

The soil resistant laminate compositions according to the invention comprising, consisting essentially of or consisting of a multilayer composition having an oil/water contact angle ratio of the laminate surface of at least 2, comprising a clean surface as a bottom layer and a dried layer of the soil resistant treatment composition comprising at least one soil resistant agent as a top layer, wherein said dried layer is formed from an aqueous solution of from about 0.005% to about 5%, preferably from about 0.1% to about 5% soil resistant agent in an aqueous use solution of a soil resistant agent having a lower molecular weight from about 1,000 to about 20,000 g/mol. According to a preferred embodiment, the soil resistant agents (and soil resistant treatment compositions) are substantially free of fluorinated or silicone substituents, are modified such that no viscosity-building or threshold activity is exhibited, and/or are substantially free or free of volatile organic compounds.

According to an embodiment of the invention, the soil resistant treatment compositions modify or change the water and oil contact angles exhibited by a treated surface. The soil resistant treatment compositions prevent the adhesion of soils to the treated surface while promoting displacement behavior to create a self-cleaning surface. In some instances it may be desirable to increase one or both of the water contact angle or oil contact angle. For example, the water contact angle can be significantly reduced or the oil contact angle can be significantly increased, in order to increase the ratio of oil contact angle to water contact angle. Also, it will be preferred to select the nature and type of treatment based on the ratio of oil contact angle to water contact angle for the treated surface. Preferably the ratio of oil contact angle to water contact angle for the laminate surface resulting from the soil resistant treatment compositions on the clean surface according to the invention is at least 2. More preferably, the ratio of oil contact angle to water contact angle of the laminate surface according to the invention is at least 4. Most preferably, the ratio of oil contact angle to water contact angle of the laminate surface according to the invention is at least 6.

The ratio of oil contact angle to water contact angle of the laminate surface according to the invention of at least 2, preferably at least 4 and most preferably at least 6 provides enhanced soil resistance of both inorganic and oily soils from the treated clean substrate. When the ratio of oil contact angle to water contact angle is sufficiently high, water tends to form a sheet on the treated surface, oil tends to form beads on the treated surface, and the water sheet tends to wedge underneath the soil and lift away the oil beads from the treated surface. This phenomenon can be observed by placing a water droplet and oil droplet side-by-side on the treated surface and observing the behavior of the droplets under magnification when they contact one another.

A further embodiment of the invention includes a laminate composition comprising, consisting essentially of or consisting of a porous or non-porous surface, such as a floor surface, and at least one continuous or non-continuous coating or layer adhered to the treated surface by a physical or chemical bond including, for example, by ionic or covalent bonding.

According to the invention, the dry-to-touch laminate surface formed by the soil resistant treatment compositions of the invention, in combination with the oil/water contact angle ratio of at least 2 provide enhanced soil resistance. Not intending to be limited by a particular theory, it is believed that the combination of the at least two soil resistance mechanisms of action provide enhanced soil resistance. The soil resistance mechanisms are distinct from those of soil release agents, as a laminate resistant surface is formed rather than a tacky film or surface, which would causes a clean surface to become soiled more quickly, as would result from commercially-available soil release agents being applied to a clean surface.

The laminate surface formed by the soil resistant treatment compositions of the invention can be further enhanced by the addition of a soil release agent. Particularly suitable soil release agents for use in combination with the soil resistant agents according to the invention include a hydrophobically-modified amphoteric acrylic copolymer soil release agent. Exemplary acrylic copolymer includes Polyquart® Pro and/or Polyquart® Ampho 149, which are available from Cognis Corporation and may be hydrophobically modified according to embodiments of the invention.

Methods of Use

An embodiment of the invention includes a method for treating a surface, preferably a clean surface or a substantially clean surface, comprising, consisting essentially of or consisting of applying to a clean surface a soil resistant treatment composition according to the invention and forming a laminate film of the soil resistant treatment composition over the clean surface. An additional method step of removing soils from the top surface of the formed laminate film may further be included according to the invention.

According to additional embodiments of the invention, the soil resistant treatment composition can be applied to a wide variety of hard, porous and/or nonporous surfaces. Exemplary hard surfaces include: architectural surfaces, such as showers, walls, windows, countertops, appliances, tabletops, etc.; vehicle surfaces, such as cars, trucks, boats, railroad cars and planes, especially for problem areas such as windshields, rubberized trim, hulls, aluminum rails, wheels, etc.; commercial or industrial process equipment, such as "clean in place" treatments for food, beverage and other process equipment; grill cleaners, protective treatments for water handling (e.g., process water) systems; grill surfaces and the like.

In some embodiments of the invention, hard surfaces may include certain porous surfaces, including for example: textiles or fabrics, floors and the like. For example, porous surfaces may include floors, such as those disclosed in U.S. Patent Application Publication No. 2012/0148830 published Jun. 14, 2012 and U.S. Pat. No. 8,585,829 issued Nov. 19, 2013, herein incorporated by reference in its entirety. Floors may include uncoated floors (e.g. not coated with floor finishes), including for example, polished and unpolished marble, polished and unpolished concrete, terrazzo and ceramic tile. Additional floor surfaces may include, whether porous or non-porous, marble, granite, terrazzo, concrete, dry shake, ceramic tiles, wood, linoleum, vinyl, cork, bamboo and rubber substrates.

Exemplary hard surfaces, whether porous or nonporous, intended for use according to the invention include, for example, glass, porcelain, ceramic, wood, fiberglass, plastic, rubber, metals, hard flooring surfaces, including vinyl, vinyl composite, wood, ceramic tile, concrete and/or stone, paint a polymer or combinations thereof.

According to a further embodiment, the method comprises, consists essentially of or consists of applying to a clean surface an aqueous solution of about 0.005% to about 5%, preferably from about 0.1% to about 20% soil resistant agent in an aqueous use solution of a soil resistant agent having a low molecular weight from about 1,000 to about 20,000 g/mol. and forming a laminate film of the soil resistant treatment composition over the clean surface, and/or drying the composition to form a coating of the soil resistant treatment composition over the treated surface. The treated surface can then be cleaned to remove soils from the laminate film. The methods of the invention may further include the use of a soil release agent and/or additional soil resistant agent for synergistic improvements in cleaning efficiency of the treated surface. According to an embodiment of the invention, an aqueous solution may further comprise about 0.005% to about 20%, preferably from about 0.1% to about 5% soil release agent.

Although not intended to be limited according to a particular theory, the forming of a laminate film on a surface results in a physical coating (e.g. a mechanical adhesion) rather than a chemical bond (e.g. a covalent bond) to the substrate surface. Methods according to the invention may further include using a separate detergent product to preclean a suitable surface prior to treatment with the soil resistant copolymer composition and leaving a residue, such as a laminate film of the copolymer soil resistant, on the clean surface. According to a further embodiment, the soil resistant treatment composition is not used in combination with surfactants. According to a still further preferred embodiment, the soil resistant treatment composition is not used in combination with a detergent or other cleaning agent.

According to a further embodiment, the polymer layer of the soil resistant laminate is not discernible by visual inspection. According to a still further embodiment, the polymer layer does not constitute a floor finish.

According to the invention, subsequent cleaning of the treated surface results in easier cleaning (i.e. enhanced cleaning efficiency) due to soil being lightly adhered to the surface rather than bonded to the surface. As a result, the surface may be subsequently cleaned with a gentle source of water (i.e. hose or naturally as a result of rain), or cleaned without the use of water, such as with mechanical action, compressed air, etc. For example, according to one embodiment of the invention a treated surface such as vehicle may be cleaned with a source of compressed air (i.e. air curtain) rather than requiring a water source. This would be particularly beneficial in drought-stricken areas where water is at a premium.

The soil resistant treatment composition according to the invention may be applied to a clean surface. A surface to be treated according to the invention may subsequently be cleaned using cleaning agents or solvents that will be familiar to those skilled in the art. Application of the soil resistant treatment composition may include the step of spraying or evenly spreading the composition over the surface and wiping off (e.g. removing by mechanical force such as a sponge or other receptacle) any excess composition. The method may further include allowing the laminate film layer to dry and form an invisible film after applying to said clean surface. According to an embodiment of the invention, the soil resistant treatment composition is allowed to remain on the clean surface for sufficient period of time to enable formation of a dry-to-touch laminate film. According to an embodiment of the invention, the soil resistant treatment composition forms a dry-to-touch laminate film within about an hour, preferably within about 30 minutes, more preferably within less than five minutes and still more preferably within less than one minute.

The laminate film formed over the clean surface by the soil resistant agent is an invisible film. Preferably the laminate film is water resistant, more preferably the film is water resistant and not water insoluble. The dry-to-touch laminate film formed by the soil resistant treatment composition is layered or coats the clean surface and exhibits soil resistant properties minimizing and/or preventing bonding of soils to the surface.

In addition, the step of removing soils from the laminate film may further include applying a water source and/or mechanical force to remove soils. For example, the use of non-traditional mechanical force, such as compressed air or a vacuum can be utilized to clean the soil-resisting laminate film. Preferably, a source of compressed air can be used to clean the treated surface without the need for any water. In an embodiment of the invention, soil on the laminate is removed using compressed air, alone or combined with water. The laminate film can be cleaned accordingly without the need to reapply the soil resistant copolymer composition, for example, for several weeks and even months. When desirable, additional soil resistant treatment composition may be applied to a cleaned surface to provide ongoing soil resistance.

Preferably, the step of removing soils from the laminate film does not require a detergent composition for the removal of soils and/or cleaning of the treated surface to maintain soil resistance of the surface.

As a result, the soil resistant laminate can be cleaned with water, without causing removal of the soil resistant laminate, for extended periods of time. The laminate film can be cleaned, for example with a deliberate flow of water, such as from a hose or a natural source such as rain for external surfaces, without the need to reapply the soil resistant copolymer composition, for example, for several weeks and even months. When desirable, additional soil resistant treatment composition may be applied to a cleaned surface to provide ongoing soil resistance.

If desired, the soil resistant copolymer laminate layer can be removed by those skilled in the art by a variety of techniques that can be employed to bring about such removal. One convenient method is by spraying or soaking the treated surface with a removal solution.

Kits

According to a further embodiment of the invention, the soil resistant treatment composition of the invention can be packaged and provided as kits for soil resistant surface treatments. According to an embodiment of the invention, a kit may comprise, consist of and/or consist essentially of the soil resistant agent according to the invention (formulated into the soil resistant treatment composition), an applicator, and suitable instructions for use. According to additional embodiments of the invention the kit may also optionally include a removal agent for removing a plurality of soils from a treated surface a removal agent for removing a plurality of soils from a treated surface. In one embodiment, the kit includes the soil resistant composition and a separate cleaning agent that may be optionally combined with the soil resistant composition prior to use.

An applicator for a kit according to the invention may include a variety of means of application. For example, as one skilled in the art may ascertain, applicator may include a mechanism to spray a liquid, including for example a misting applicator, a mop, a dispenser, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Exterior Window Treatment

Soil resistant window compositions were prepared according to the invention using various dilutions of the soil resistant copolymer composition of the invention (commercially available from BASF). The tested maleic/hydrophobicly modified olefin copolymer had 25% solids and a molecular weight of about 3000. The copolymer was sprayed onto an exterior window and then wiped dried with paper towels to remove excess liquid. The soil resistant copolymer composition was compared to a control window sprayed with a commercial glass cleaner (Glass Force®, Ecolab) which was also applied to a window and then wiped dry with paper towels to remove excess liquid.

Figure 1B:
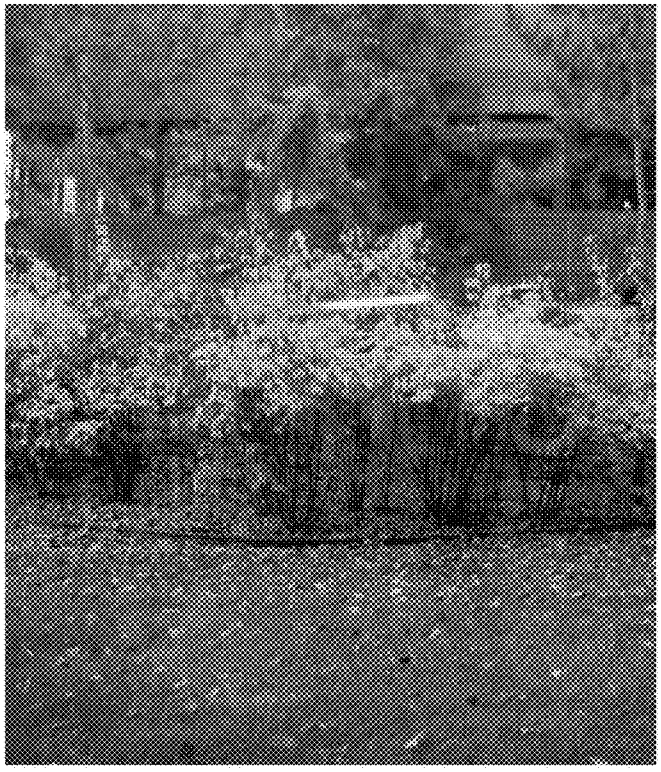

The windows were exposed to the elements without any cleaning for 6 months. The windows were equally subjected to rain, roof run-off, blowing dust, and an in-ground irrigation system using 17 grain hardness well water. The windows treated with the maleic/hydrophobicly modified olefin copolymer according to the invention (both 5% and 1%) remained significantly-free of soils after the 6 month period. FIG. 1A shows the control window was significantly soiled and required cleaning to remove visible soils from surface after six months. FIG. 1B shows the window treated with 5% soil resistant copolymer composition did not yet require cleaning. The maleic/hydrophobicly modified olefin copolymer provided soil resistance to the treated windows as demonstrated by the windows being substantially cleaner at the end of the test period than the control.

The soil-resistant action further demonstrates unexpected longevity. Treated windows have remained with demonstrated soil resistance for up to at least three years. Although not intended to be limited according to a particular theory, the soil resistant agent forms a laminate layer over the treated surface and provides the soil resisting properties that effectively prevent soils from bonding to the surface.

Example 2

Conversion of Other Substrates into Soil Resistant Laminate

Figure 2A:
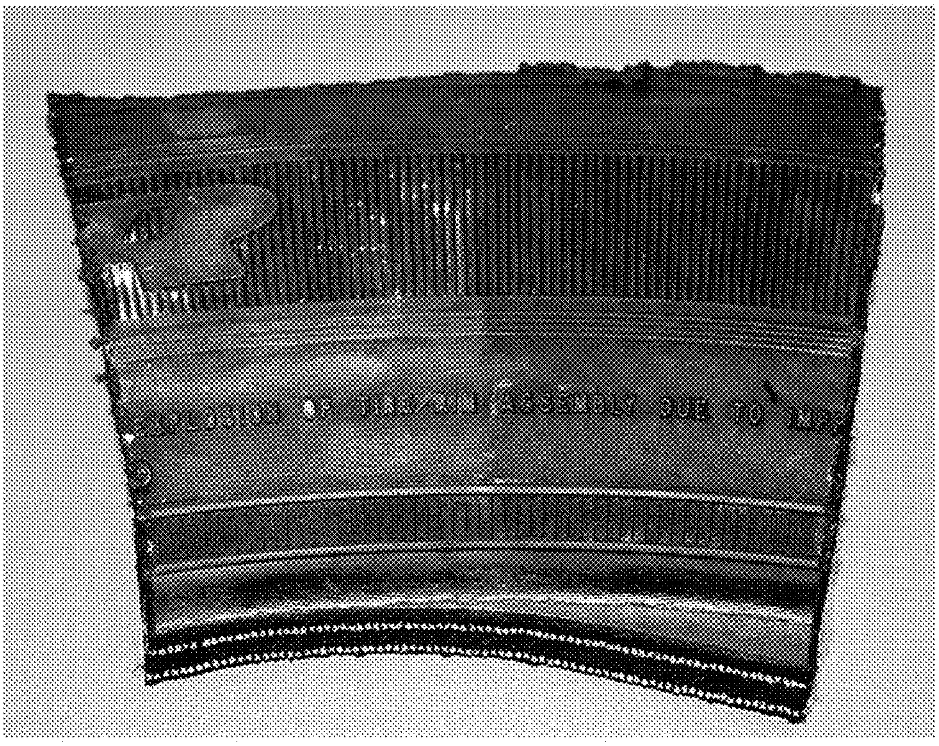
FIGS. 2A-2E show photographs of various surfaces treated with the soil resistant laminate composition according to the invention and control (no treatment); compounded rubber (tire) (FIG. 2A), plastic (ABS) (FIG. 2B), glass (FIG. 2C), metal (FIG. 2D, steel (left-hand side) and aluminum (right-hand side) and metal with automotive clear coat (FIG. 2E).
Figure 2B:
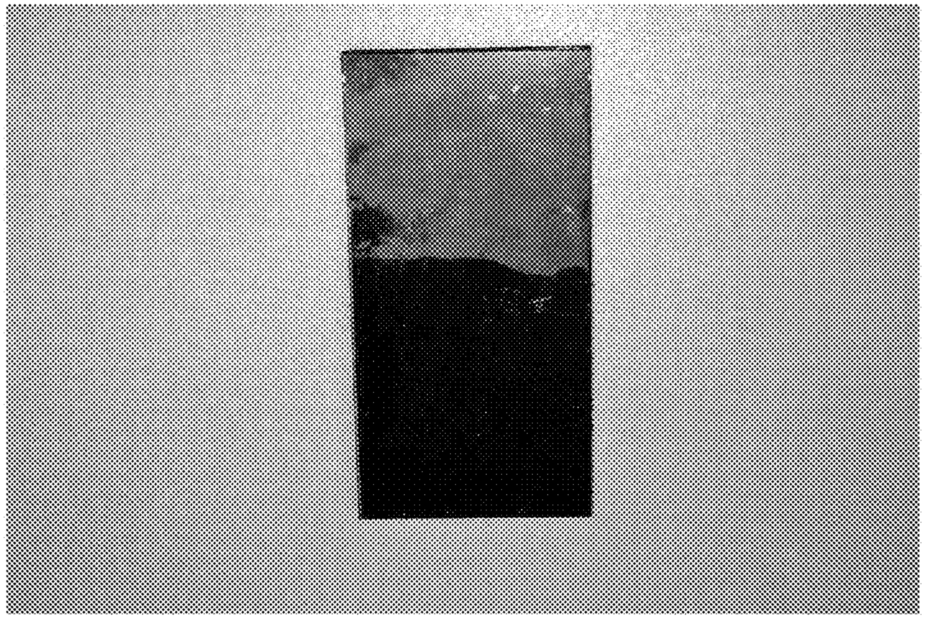
Figure 2C:
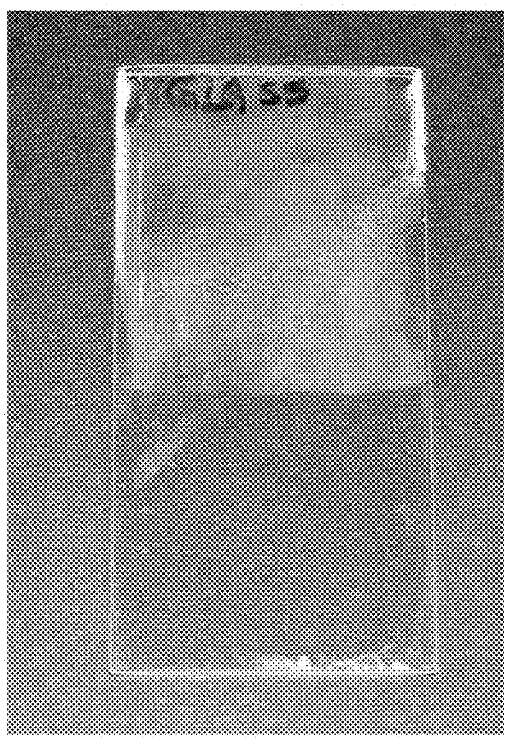
Figure 2D:
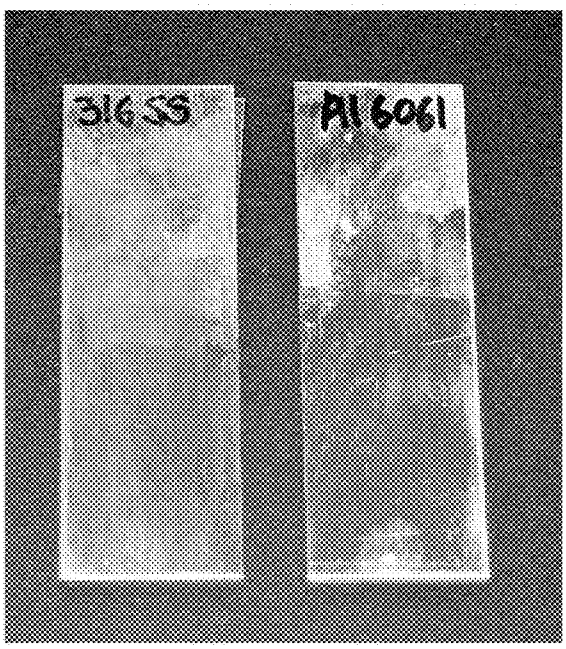
Figure 2E:

A 5% solution of the maleic/hydrophobicly modified olefin copolymer was applied to half of various clean surfaces, including rubber, plastic, glass, stainless steel and aluminum, as a pretreatment. The other half of the various clean surfaces was left untreated. The soil resistance of those surfaces was evaluated by applying a clay dust to the entire dry surface and then rinsing the entire surface briefly with water in the absence of detergent. As the below pictures illustrate, the clay was removed by the water from all the pretreated test surfaces. The untreated portions of the surfaces remained soiled with the clay even after a water rinse. FIGS. 2A-2E demonstrate the remaining portion of clay on the untreated portions of the broad range of substrates, including compounded rubber (tire) (FIG. 2A), ABS-type plastic (FIG. 2B), glass (FIG. 2C), metal (FIG. 2D, steel type 316 (left-hand side) and aluminum type 6061 (right-hand side) and black metal topped with automotive clear coat (FIG. 2E).

Example 3

Shower Door Treatment

Figure 3A:
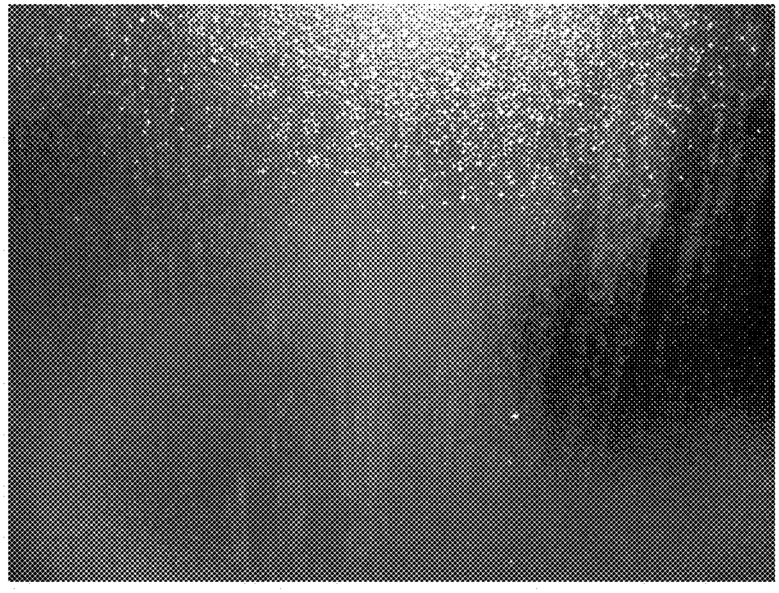
FIGS. 3A-3B show photographs of the heavy soiling found on a shower door after one month of use (FIG. 3A) and the clean portion of a shower door treated with the soil resistant laminate composition according to the invention (FIG. 3B).
Figure 3B:

A 2% solution of the maleic/hydrophobicly modified olefin copolymer was applied to half of a shower door. The other half of the door was left untreated as a control. The shower was used as normal for one month in a home with softened water and without any cleaning or drying. FIGS. 3A-3B show the shower door after one month with the untreated portion of the door showing heavy soiling (FIG.

3A) and the treated portion according to the invention remaining essentially free of soap scum and hard water scale (FIG. 3B).

Example 4

Removal of Soil Using Compressed Air from a Soil Resistant Glass Laminate

A glass slide was treated with 2.5% solution of the maleic/hydrophobicly modified olefin copolymer in a detergent carrier (Glass Force®, Ecolab) to form a soil resistant laminate. A second glass slide was cleaned with the unmodified formula (Glass Force®, Ecolab). Clay was used to soil the entire surface of the slides and compressed air alone was then used to blow non-adhering clay on each of the surfaces.

The glass slide with the soil resistant laminate provided substantial cleaning with the air flow alone, whereas the glass slide without the soil resistant laminate did not demonstrate removal of remaining soil with air flow alone. The experiment demonstrates the ability to use indirect mechanical action (excluding water) to clean a surface treated with the soil resistant maleic/hydrophobicly modified olefin copolymer according to the invention.

Example 5

Field Test of Soil Resistant Glass Laminate

Figure 4:
FIG. 4 shows a photograph of the difference in soils on a portion of soil resistant laminate treated window versus control.

One-half of the back window of a pick-up truck topper was converted to a soil resistant laminate using a maleic/hydrophobicly modified olefin copolymer in a detergent carrier (Glass Force®, Ecolab). The other half was cleaned with the unmodified glass cleaner. The vehicle was driven for about 2 hours. As FIG. 4 demonstrates the portion of the window with the soil resistant laminate remained substantially freer of soils than the control half. Without being limited to a particular theory, the treated portion of the window comprising the soil resistant laminate remained substantially-free of soil as a result of the mechanical action of air blown on the window during the driving process.

Example 6

Comparison of Soil Resistant Laminate versus Commercial Soil Release Agents

Figure 5:
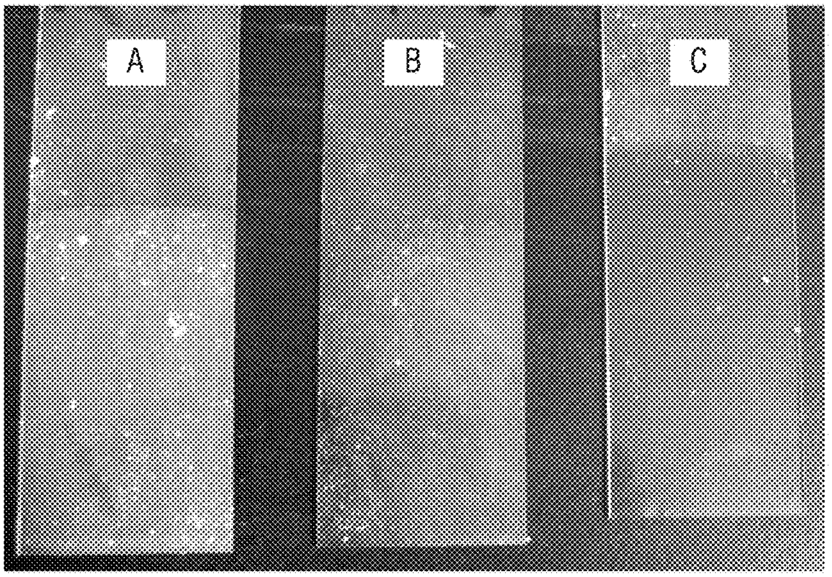
FIG. 5 shows a photograph of glass slides treated with 300 ppm of the maleic/hydrophobicly modified olefin copolymer soil resistant ("C") (ES8804 commercially available from BASF Corporation, Florham Park, N.J.) compared to glass slides treated with commercial soil release agents ("A" and "B") (Polyquart Pro and Polyquart Ecoclean commercially available from Cognis Corporation, now BASF Corporation).

Half of glass slides were treated with 300 ppm of the maleic/hydrophobicly modified olefin copolymer soil resistant (FIG. 5"C"), Cognis Polyquart Ecoclean soil release agent (FIG. 5"A"), or Cognis Polyquart Pro soil release agent (FIG. 5"B"). Each of the glass slides were air-dried and then dusted with kaolin clay. Loose clay was removed by tapping each slide three times.

The Polyquart soil release agents, when applied to clean glass, acted as a soil attractant and caused more clay to adhere to the treated area than the untreated area. In contrast, the area treated with the maleic/hydrophobicly modified olefin copolymer soil resistant agent according to the invention interfered with adhesion of the clay and left the treated area significantly cleaner than the untreated area, demonstrating the benefit of the present invention as a glass laminate for soil resistance over existing art.

When combined with a soil resistant agent such as the Polyquart Pro material, the 8804 polymer, in 1:1 weight ratio, the soil attractant properties of the Polyquart soil release were greatly reduced as demonstrated using the clay adhesion test on treated glass slides.

Example 7

Contact Angles of Soil Resistant Glass Surface Versus Untreated Glass Surface

Figure 6:
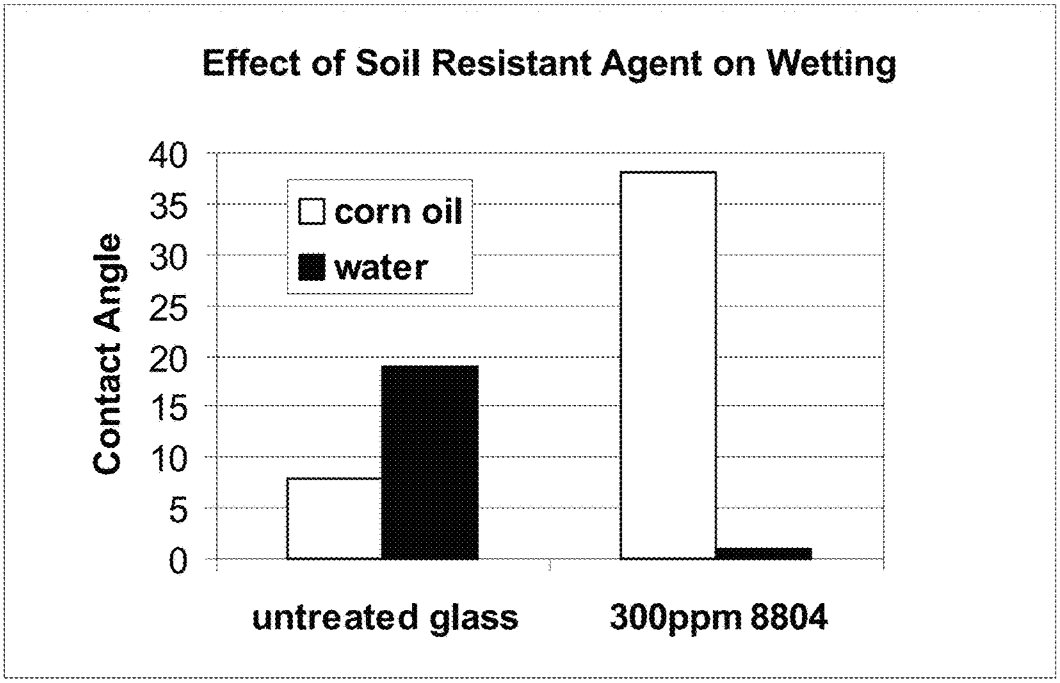
FIG. 6 shows a table measuring the surface contact angle for both corn oil and water of the treated surface and a control surface.

The effects of the soil resistant agent according to the invention on wetting were analyzed and measured according to the ratio of oil contact angle to water contact angle for each surface. Glass slides were treated with 300 ppm of the maleic/hydrophobicly modified olefin copolymer soil resistant and compared to untreated glass slides (control). The surfaces were contacted with both corn oil and water in order to measure the oil contact angle and water contact angle of the treated surfaces. The ratio of oil contact angle to water contact angle for the treated surface was then calculated (FIG. 6).

The ratio of oil contact angle to water contact angle for the untreated glass surface was 0.4 (oil contact angle: 8, water contact angle: 19) (control). In comparison, according to a preferred embodiment of the invention, the ratio of oil contact angle to water contact angle for the soil resistant treated glass was 38 (oil contact angle: 38, water contact angle: 1). Treated surfaces according to the invention demonstrate the "sheeting" of water and "beading" of oils contacting the treated surface. As a result, water sheets wedge underneath the soil and lift away the oil beads from the treated surface providing a soil resistant surface.

Example 8

Composition Concentrations for Soil Resistant Applications

Various concentrations of the maleic/hydrophobicly modified olefin copolymer soil resistant agent according to the invention were tested to determine the preferred polymer concentration. In addition various concentrations for the olefin copolymer soil resistant agents and the acrylate copolymer soil resistant agents were tested to determine the preferred polymer concentration.

Concentrations from about 1% to about 15% solutions of each copolymer soil resistant agent were applied to various surfaces. More concentrated solutions, such as 15% polymer solids, were observed to not sufficiently dry. In addition, the more concentrated solutions of the copolymer soil resistant did not provide desired longevity of soil resistance in the presence of water. In the alternative, extremely dilute solutions, such as less than 0.1% polymer solids, showed reduced effectiveness as a soil resistant composition on a clean surface.

Maleic/hydrophobicly modified olefin copolymers from at least 0.1% to about 5% demonstrated formation of a transparent dry-to-touch laminate as desired according to the invention.

Acrylate/olefin copolymers from at least 0.1% to about 5% demonstrated formation of a transparent dry-to-touch laminate as desired according to the invention.

Example 9

Half of glass slides were treated with 300 ppm of maleic/olefin copolymer soil resistant agent according to the invention. Each of the glass slides were air-dried and then dusted with kaolin clay. Loose clay was removed by tapping each slide three times. Soil release agents were compared for efficacy and formation of a soil resistant laminate with the surface. The various copolymers were examined to show that some polymers acted as a soil attractant and caused more clay to adhere to the treated area than the untreated area. Although not intending to be limited to a particular theory, the effects of attracting soil by some agents was indicative of the mechanism of action of certain soil release agents (e.g. treated surface becomes sticky which attracts soils but allows for easily wiping the surface to remove soils).

In contrast, the area treated with the olefin copolymer soil resistant agent according to the invention interfered with adhesion of the clay and left the treated area significantly cleaner than the untreated area, demonstrating the benefit of the present invention as a glass laminate for soil resistance over existing art.

Comparisons of various tested copolymers are shown below.

| Excellent Resistance | Moderate Resistance | No Effect | Attracted Soil |
|---|---|---|---|
| ES8804 | Sokalan PM 101 | Sokalan PM 70 | Jaypol 871 |
| Acusol 460 | Aquatreat AR-545 | Acusol 544 | Jaypol 872 |
| Sokalan CP9 | Acusol 820 | Acusol 445 | Gantrez S-95 |
| Acusol 929 | Acusol944 | Sokalan CP44 | Acusol 5240 |
| | Acusol 805S | Alcosperse 125 | Solalan PA30CL |
| | Sokalan CP42 | Acusol 448 | Polyquart Pro |
| | Acusol 801 | Acumer 2100 | |
| | Acusol 441 | Versaflex 1 | |
| | Acusol 505 | Bequest 2010 | |
| | Sokalan PA15 | Bayhibit AM | |
| | Acusol 588 | | |
| | Sokalan PM10 | | |
| | Acusol 587 | | |
| | Acumer 2000 | | |
| | Acusol 588 | | |
| | Aquatreat AR-6 | | |
| | Alcosperse 747 | | |
| | Acumer 3100 | | |
| | Acumer 1480 | | |
| | Acumer 5242 | | |
| | Belclene 200 | | |
| | Acumer 1510 | | |
| | Versa TL-4 | | |
| | Acumer 5000 | | |
| | Aquatreat AR-200 | | |
| | Sokalan PM15 | | |
| | Sokalan CP50 | | |

The above-tested commercially-available polymers and copolymers which may be further suitable for use as a soil resistant copolymer include: Acusol 929, polyacrylate (trademark of Rohm & Haas, now Dow Chemical Company); Sokalan CP-9 a maleic acid/olefin copolymer sodium salt, Acusol 460, and ES8804 (aka 8804). However, Acusol 460 is a threshold agent and therefore not desirable for use in a cured film on a solid substrate. Sokalan PM 10/Sokalan PM 15/Sokalan CP42/Sokalan CP50, modified polycarboxylates, Sokalan PAIS, polyacrylic acid, sodium salt (trademarks of BASF); Belclene 200, polymaleic acid copolymer (trademark of BWA Water Additives); Versa TL-4,2, 5-furandione with sulfonated styrene, sodium salt (trademark of Akzo-Nobel); Aquatreat AR-545, acrylic acid/2-acrylamido-2-methlpropane, Aquatreat AR-6, polyacrylic acid, Aquatreat AR-200, unknown structure (trademarks of Akzo-Nobel); Alcosperse 747, hydrophobically modified copolymer of undefined structure showed slight activity as soil release agents. However, these materials are threshold agents for use in water and therefore not desirable as soil resistance agents. Alcosperse 125, acrylate polymer (trademarks of Akzo-Nobel); Acusol polymers (trademarks of Dow Chemical Company). Sokalan PM 70, Acusol 544, Acusol 445, Sokalan CP44, Alcosperse 125, Acusol 448, Acumer 2100, Versaflex 1, Dequest 2010, and Bayhibit AM did not show activity as soil resistant agents. Jaypol 871, Jaypol 872, Gantrez S-95, Acusol 5240, Solalan PA30CL, and Polyquart Pro increased the extent of soiling when applied to a clean hard surface.

Preferred embodiments of the invention include compositions and methods employing compositions using a soil resistant agent selected from the group consisting of commercially-available soil resistant agents ES8804, Sokalan CP9, and combinations thereof. In addition, as described according to an embodiment of the invention, Polyquart Pro (soil release agent from Cognis Corporation) may further be combined with the soil resistant agents for improved and/or synergistic soil resistance.

Preferably, according to the invention the soil resistant agent does not include an agent selected from the group consisting of commercially-available products Jaypol 871, Jaypol 872, Gantrez S-95, Acusol 5240, Sokalan PA30CL and combinations thereof.

Still further preferably, according to the invention the soil resistant agent does not include an agent selected from the group consisting of commercially-available products Sokalan PM, Acusol 544, Acusol 445, Sokalan CP44, Alcosperse 125, Acusol 448, Acumer 2100, Versaflex 1, Dequest 2010, Bayhibit AM and combinations thereof.

Example 10

Grout coupons were treated with aqueous solutions containing the additive set forth in Table below. Sokalan CP9 was dissolved in DI H2O to form a 25.0% solids aqueous solution (Sokalan CP9 25%) prior to making the use solution for grout treatment. All of the use solutions for grout treatment were made by mixing 0.20 g of the additive with tap water to a total weight of 100.0 g. The grout was treated with 1.3 g per ½ coupon of the solution, and 2 applications were carried out for each condition.

| Exp. | 1 | 2 | 3 | 4 | 5 |
|---|---|---|---|---|---|
| Additive | Sokalan CP9 (25%) | ES8804 | Acusol 929 | ES8804 | Tap H2O |
| Coupon # | Coupon 1 | Coupon 1 | Coupon 2 | Coupon 2 | Coupon 3 |

The Table below shows the Wb and L values of the Experiments, with a Lower Delta value (non soiled−soiled) indicating better stain resistance.

| Exp | Wb non soiled | Wb soiled | Delta Wb | L non soiled | L soiled | Delta L |
|---|---|---|---|---|---|---|
| 1 | 57.33 | 24.61 | 32.72 | 91.96 | 85.19 | 6.77 |
| 2 | 57.08 | 23.86 | 33.22 | 91.88 | 85.17 | 6.71 |
| 3 | 67.12 | 8.78 | 58.34 | 92.85 | 60.90 | 31.89 |
| 4 | 57.92 | 26.06 | 31.86 | 92.09 | 86.11 | 5.98 |
| 5 | 62.10 | 11.08 | 51.02 | 92.55 | 65.12 | 27.43 |

The above results showed that Experiment 1 having Sokalan CP9 and Experiments 2 and 4 including ES8804, significantly improved the red wine stain resistance when compared to the water treated coupon. This example demonstrates that the red wine soil resistance of a treated surface can be significantly improved with ES8804 and Sokalan CP9. This example also demonstrates that Sokalan CP9 is a commercially available substitute of ES8804 that would be expected to perform substantially similarly.

The inventions being thus described, it will be obvious that the same may be varied in many ways. Such variations are not to be regarded as a departure from the spirit and scope of the inventions and all such modifications are intended to be included within the scope of the following claims.

The methods and compositions of the present invention can comprise, consist of, or consist essentially of the listed steps or ingredients. As used herein the term "consisting essentially of" shall be construed to mean including the listed ingredients or steps and such additional ingredients or steps which do not materially affect the basic and novel properties of the composition or method. In some embodiments, a composition in accordance with embodiments of the present invention that "consists essentially of" the recited ingredients does not include any additional ingredients that alter the basic and novel properties of the composition.

What is claimed is:

1. A soil resistant laminate composition comprising:

a multilayer composition comprising:

a clean surface as a bottom layer, wherein said surface is a substrate selected from the group consisting of glass, fiberglass, concrete, ceramic, porcelain, plastic, rubber, metals, paint, a cured polymeric coating and combinations thereof; and a dried polymer layer disposed as a top layer on said clean surface, wherein said polymer layer comprises from about 0.005 wt % to about 20 wt % of at least one soil resistant agent having a molecular weight from about 1,000 to 20,000 g/mol and a water or organic solvent carrier;

wherein the soil resistant agent is selected from copolymers from the group consisting of a maleic/hydrophobically-modified olefin, an olefin/acrylate and combinations thereof, wherein said soil resistant agent is substantially free of silicone substituents, wherein polymer layer is substantially free of fluorinated substituents and volatile organic compounds (VOC).

2. The composition according to claim 1 wherein said soil resistant agent is a maleic/olefin, an olefin/acrylate or combinations thereof having a molecular weight from about 1,000 to about 10,000 g/mol.

3. The composition according to claim 1 wherein said soil resistant agent is modified such that no viscosity-building or threshold activity is exhibited.

4. The composition according to claim 2 wherein said molecular weight is from about 2,000 to 10,000 g/mol and said olefin polymers are hydrophobically modified.

5. The composition according to claim 2 wherein said soil resistant agent is an olefin/acrylate copolymer wherein the olefin is selected from the group consisting of ethylene, propylene, butylene, isobutylene and combinations thereof.

6. The composition according to claim 2 wherein said soil resistant agent is a maleic/olefin copolymer having a maleic/olefin ratio from about 1:4 to 4:1.

7. The composition according to claim 1 wherein said laminate composition surface has an oil/water contact angle ratio of at least 2.

8. The composition according to claim 1 further comprising an amphoteric acrylic copolymer soil release agent and wherein said clean surface is a substrate selected from the group consisting of glass, fiberglass, concrete, plastic, rubber, metals, and combinations thereof.

9. A soil resistant treatment use composition comprising:

about 0.005 wt % to about 20 wt % of a soil resistant agent selected from co-polymers from the group consisting of a maleic/hydrophobically-modified olefin, an olefin/acrylate, and combinations thereof having a molecular weight from about 1,000 to 20,000 g/mol;

about 0.005 wt % to about 20 wt % of at least one amphoteric acrylic copolymer soil release agent; and a water or organic solvent carrier, wherein the composition is substantially free of fluorinated substituents, silicone substituents, and volatile organic compounds (VOC).

10. The composition according to claim 9 wherein said soil resistant agent is a copolymer of maleic/olefin having a ratio of acrylic to maleic moieties from about 0.02:1 to 5:1.

11. The composition according to claim 9 wherein the ratio of the acrylic to the maleic moieties is from about 0.05:1 to 1:1.

12. The composition according to claim 9 wherein said composition is substantially free of alkali soluble resins and plasticizers, and said soil release agent is modified such that no viscosity-building or threshold activity is exhibited.

13. The composition according to claim 9 wherein said oil/water contact angle ratio of a surface treated with said composition is at least 2.

14. The composition according to claim 13 wherein said oil/water contact angle ratio of a surface treated with said composition is at least 4.

15. The composition according to claim 9 wherein said soil resistant agent is a maleic/olefin copolymer having a molecular weight from about 2,000 to 5,000 g/mol and has a maleic/olefin ratio from about 1:2 to 2:1.

16. A kit comprising:

a soil resistant treatment use composition according to claim 9;

an applicator; and instructions for use of said kit.

17. A method for treating a clean hard surface (wherein the hard surface can be porous or non-porous) comprising:

applying to said surface an aqueous solution comprising from about 0.005% to 20% of a soil resistant agent selected from copolymers from the group consisting of a maleic/hydrophobically-modified olefin, an olefin/acrylate and combinations thereof, wherein said soil resistant agent has a molecular weight from about 1,000 to 20,000 g/mol, and wherein said solution is substantially free of fluorinated substituents, silicone substituents, and volatile organic compounds (VOC); and a water or organic solvent carrier; and forming a dried laminate layer of said soil resistant agent over said clean surface, wherein said laminate layer has an oil/water contact angle ratio of at least 2.

18. The method according to claim 17 further comprising the step of first diluting said soil resistant agent with a water or organic solvent carrier before applying said composition to said clean surface.

19. The method according to claim 17 further comprising the step of allowing said laminate layer to dry and form an invisible film and cleaning said treated surface after a period of time with compressed air and without a source of water to remove soils.

20. The method according to claim 17 wherein said soil resistant agent has a molecular weight from about 2,000 to 5,000 g/mol and wherein said oil/water contact angle ratio is at least 6.

21. The method according to claim 17 further comprising cleaning said treated surface after a period of time without a source of water, and wherein said surface is a substrate selected from the group consisting of glass, concrete, porcelain, ceramic, fiberglass, plastic, rubber, metals, paint, a cured polymeric coating and combinations thereof, and wherein said removal of soil step includes application of a water source and/or mechanical force.

22. The method according to claim 17 further comprising adding an amphoteric acrylic copolymer soil release agent to said aqueous solution.

* * * * *